(12) United States Patent  
SanCartier (10) Patent No.: US 9,061,722 B2
(45) Date of Patent: Jun. 23, 2015

(54) MOTORCYCLE COVER STOWABLE IN SEAT CUSHION

(71) Applicant: Custom Color Caps, Inc., Hugo, MN (US)

(72) Inventor: Joseph Darcy SanCartier, Hugo, MN (US)

(73) Assignee: Custom Color Caps, Inc., Hugo, MN (US)

( * ) Notice: Subject to any disclaimer, the term of this patent is extended or adjusted under 35 U.S.C. 154(b) by 52 days.

(21) Appl. No.: 13/771,955

(22) Filed: Feb. 20, 2013

(65) Prior Publication Data

US 2014/0232150 A1 Aug. 21, 2014

(51) Int. Cl.
*B62J 1/18* (2006.01)
*B62J 1/28* (2006.01)
*B62J 19/00* (2006.01)

(52) U.S. Cl.
CPC ... *B62J 1/28* (2013.01); *B62J 19/00* (2013.01)

(58) Field of Classification Search
USPC ........ 52/184.11; 297/184.11, 188.04, 188.06, 297/188.07, 219.1, 219.11; 296/77.1, 78.1, 296/136.01, 136.04, 136.1
See application file for complete search history.

(56) References Cited

U.S. PATENT DOCUMENTS

| | | | |
|---|---|---|---|
| 3,537,746 A * | 11/1970 | Peters | 296/78.1 |
| 3,884,523 A * | 5/1975 | Allen | 296/136.04 |
| 4,059,207 A | 11/1977 | Jackson et al. | |
| 4,171,145 A | 10/1979 | Pearson, Sr. | |
| 4,283,084 A | 8/1981 | Gallagher | |
| 4,520,891 A * | 6/1985 | Omholt | 180/219 |
| 4,792,040 A | 12/1988 | Wagstaff, III | |
| 5,052,738 A | 10/1991 | Ming-Bin et al. | |
| D341,552 S | 11/1993 | Schardt | |
| 5,558,698 A * | 9/1996 | Baker et al. | 95/49 |
| 5,562,139 A | 10/1996 | Cseri | |
| 5,588,698 A * | 12/1996 | Hsueh | 297/184.11 |
| 5,634,685 A | 6/1997 | Herring | |
| 5,676,288 A | 10/1997 | Spirk | |
| 5,795,008 A | 8/1998 | Allen | |
| 5,795,009 A | 8/1998 | Sack | |
| 5,820,200 A | 10/1998 | Zubillaga et al. | |
| 6,012,770 A | 1/2000 | Rubin | |
| 6,253,977 B1 | 7/2001 | Greger et al. | |
| 6,516,844 B1 | 2/2003 | Henry | |
| D494,128 S | 8/2004 | Berger | |
| 7,204,551 B2 | 4/2007 | Kahan | |

(Continued)

OTHER PUBLICATIONS

"Dennis Kirk Catalog—Parts and Accessories for Harley-Davidson(r) Motorcycles", (2012), 990-994.

(Continued)

*Primary Examiner* — William Gilbert
(74) *Attorney, Agent, or Firm* — Schwegman Lundberg & Woessner, P.A.

(57) ABSTRACT

An examples includes storing a cover for a motorcycle while providing back support for a rider. The example can include a backrest cushion housing to be mounted behind a motorcycle seat of the motorcycle, against a fixed backrest of the motorcycle, the backrest cushion housing sized to extend away from the motorcycle, above the motorcycle seat extending to at least a lumbar height of the rider, the backrest cushion housing defining an inner cavity and an opening. The example can include a cover stowable in the backrest cushion housing. The example can include a configuration wherein in a stowed mode of operation the backrest cushion housing defines a backrest cushion with padding including the cover.

20 Claims, 9 Drawing Sheets

(56) References Cited

U.S. PATENT DOCUMENTS

| | | |
|---|---|---|
| 7,213,868 B1 | 5/2007 | Tan |
| 7,252,171 B2 | 8/2007 | Augustine, Jr. |
| 7,862,100 B1 | 1/2011 | Smith |
| D642,969 S | 8/2011 | Saggau et al. |
| 8,132,839 B2 | 3/2012 | Penman |
| 2005/0161483 A1* | 7/2005 | Krohn et al. .................. 224/413 |
| 2008/0217969 A1* | 9/2008 | Mills .......................... 297/215.1 |
| 2011/0148138 A1 | 6/2011 | Penman |
| 2012/0055598 A1 | 3/2012 | Teske |
| 2014/0231478 A1 | 8/2014 | Sancartier |

OTHER PUBLICATIONS

U.S. Appl. No. 14/035,132, Notice of Allowance mailed Jan. 8, 2015, 10 pgs.

* cited by examiner

MOTORCYCLE COVER STOWABLE IN SEAT CUSHION

TECHNICAL FIELD

Embodiments pertain to motor vehicles, and more particularly to motor vehicles wherein two wheels occupy, during straight-ahead travel of the vehicle, a plane which is inclusive of, or parallel to, the longitudinal axis of the vehicle.

BACKGROUND

When traveling by motorcycle, it is often desirable to cover the motorcycle when it is parked, such as outside a hotel. Covering the motorcycle can both keep meddlers away from the exposed instruments, and maintain the seat and instruments in a dry state. A further benefit provided by a cover is to provide protection from ultraviolet rays from the sun, which can degrade polymers.

In an attempt to meet these needs, a common practice among riders has been to bring a cover with on long trips. The cover is stowed and extracted from the onboard storage compartments, such as the top case or saddle bags, and occupies space that could be otherwise used for articles such as clothing. If the cover is dirty or wet, it can soil other articles stored in the common space. It would be better if the cover used little if any storage space, and if it was isolated from other articles in storage. Further, it is desirable to provide a cover that is easy to install, even in the wind.

U.S. Pat. No. 7,252,171 to Augustin, Jr. discloses a backrest cushion mounted on the top case of a motorcycle, and optionally on a low step-up one-piece motorcycle seat, including a backrest cushion housing having a front surface, a bottom surface, left and right side walls, a front, and a cavity defined by each of the surfaces; and an access means located on the front surface of the backrest cushion facing the seat of the motorcycle; where the bottom surface is elongated and arcuate in its elongated axis to conform to the configuration of the motorcycle backrest and the backrest cushion is attached to the backrest such that the bottom surface of the backrest cushion is in contact with a top portion of the motorcycle backrest. The design is incompatible with two-up travel, is difficult to retro-fit, and does not provide adequate adjustability for rider comfort.

Others, such as disclosed in U.S. Pat. Nos. 5,664,715, 6,484,914, 5,664,715, and 6,443,344, have devised luggage racks that mount onto the top case of a motorcycle. However, luggage racks are undesirable because the contents thereon are exposed to the weather and are otherwise not protected from the elements and debris that may come in contact with the contents on the luggage rack while traveling.

U.S. Pat. No. 6,729,516 B2 to Hanagan discloses a backrest cushion for a motorcycle that can be removably mounted onto the top case. However, the design of the backrest cushion is such that if a of sufficient force come in contact with the backrest cushion, the backrest cushion may become dislodged from the backrest and/or the cover may become disengaged, exposing the contents to the elements and/or causing them to be expelled from the backrest cushion.

U.S. Pat. No. 4,726,439 to Iwao et al. discloses trunk structures in scooter-type vehicles. However, this type of structure can only be used in that type of a large-bodied two-wheeled vehicle, and is not appropriate for the sleek, aerodynamic aesthetics desired with a motorcycle.

U.S. Pat. No. 5,147,077 to Nakajima et al. discloses a storage box for a motorcycle where the storage box is located above the engine; in other words, in between the seat and, therefore, the driver of the motorcycle and the handlebars of the motorcycle. This design has the potential of making the motorcycle difficult to drive and, in some cases, dangerous, whereby the rider cannot react quickly to hazards with which he may come in contact.

Therefore, there remains in the art a need for an easy-to-store cover that does not occupy space used to store other articles, that does not expose other articles to moisture and soil from the cover, and that is easy to install.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure is directed to a backrest cushion formed from a backrest cushion housing that can be stuffed, at least partially, with a cover stowed inside the housing to provide backrest padding for a rider. The housing can include a closure that can be opened and closed to stow and retract the cover. At least a portion of the backrest cushion can be attached to a backrest such as the top case of a motorcycle.

The backrest cushion can be attached by way of one or more fasteners and can be retrofit to existing cushion mounting points, such as those coupled with a top case to affix a cushion for a passenger to the top case. Thus, examples of the present subject matter provide operators with an easy-to-use option for upgrading their motorcycle by replacing an existing lumbar seat cushion with a replacement cushion that can house a cover for the motorcycle.

Figure 1:
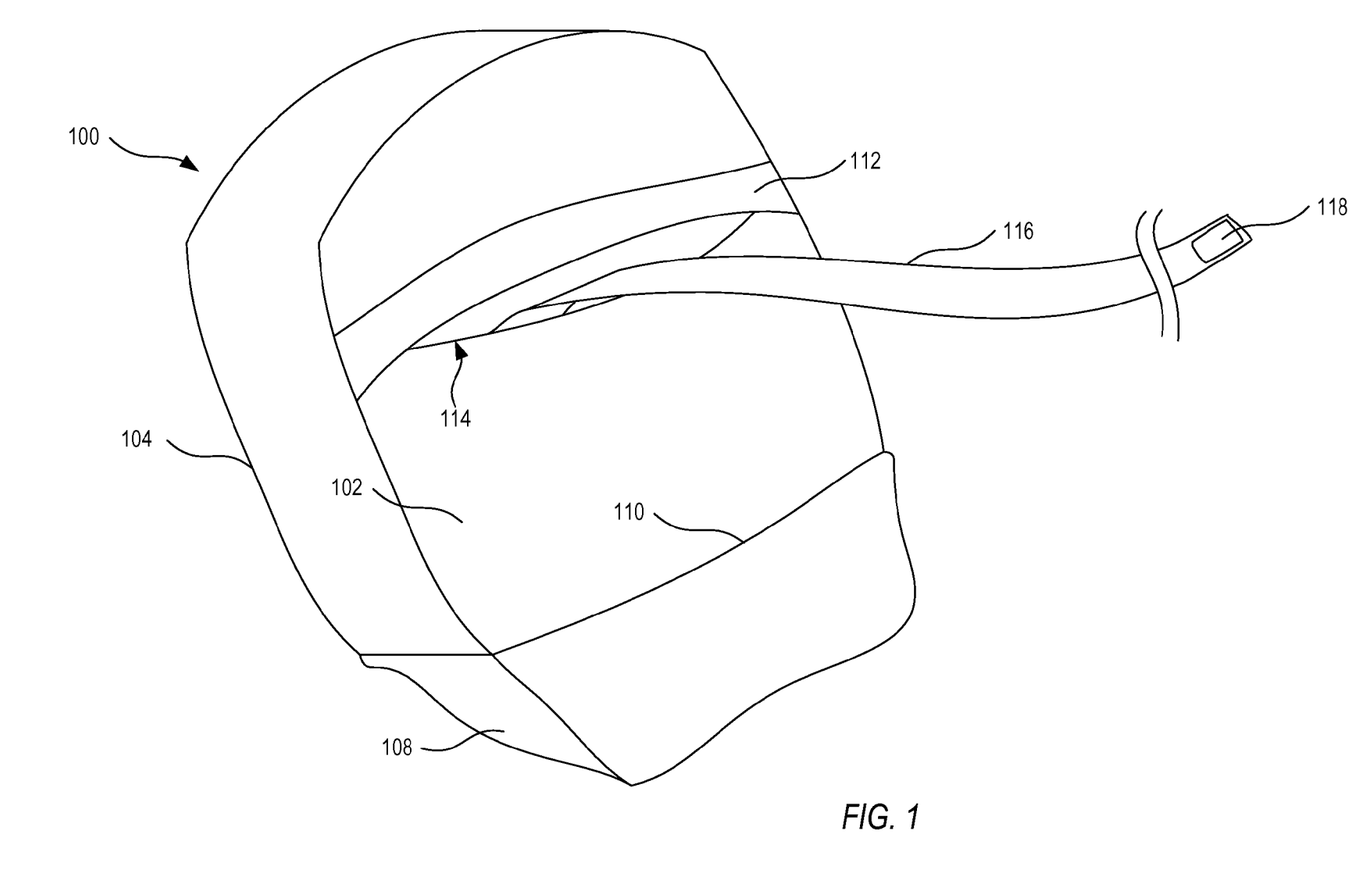
FIG. 1 shows a perspective view of a backrest cushion with a front closure, according to an example.

FIG. 1 shows a perspective view of a backrest cushion 100 with a front closure 114, according to an example. As used herein, the term "closure" refers to devices and methods used to close off or prevent further access to the internal cavities and/or compartments in the backrest cushion. Suitable closures that can be used in the invention include, but are not limited to, latching doorways, pivotally mounted locking and/or latching door or hatchways, hook-and-loop, buttons, zippers, snaps, grommets, and combinations thereof. A door or flap 112 can be mounted on the front surface 102 of the backrest cushion housing 104 so that access can be available to the cavity located therein.

The housing 104 can be formed of a single piece of material where the ends can be attached to each other by way of closure 114. Padding for the backrest cushion 100 can include a motorcycle cover, and/or other articles, including, but not limited to, clothing, foam, other pliable articles, and combinations there. The cover can be formed from any cover materials known in to be light weight, and resistant to one or more of water, transmitting light and tearing in the wind. Suitable materials can include, but are not necessarily limited to, plastics, canvas, leather, and combinations thereof. Suitable plastics include, but can be not limited to, polyesters, polyethylene terephthalate, polyurethanes, polycarbonates and combinations thereof.

A flap 112 can cover an opening of the closure 114. The flap 112 can be stretched taught against another portion of the housing to keep articles disposed therein relatively well-protected from the elements. Fasteners, such as hook-and-loop fasteners, can be used to maintain the closure 114 closed. The flap 112 and closure 114 can traverse the width of the cushion 104 from one edge to another. The flap 112 and closure 114 can be placed in the middle of backrest cushion 100. A portion of the backrest cushion housing 104 can contain an auxiliary padding such as foam, to augment cushion provided by the cover when stowed. Accordingly, the stiffness and location of the cushioning can be tailored to suit an individual rider.

A bottom portion 108 of the backrest cushion housing 104 can extend away from the housing, such as downward. The bottom portion can be affixed to a motorcycle, such as under the seat of the motorcycle, to a component of the motorcycle, for example. The bottom portion 108 can be coupled to the housing 104 along a seam 110.

A lanyard 116 can be affixed to the backrest cushion 100. The lanyard can include a lanyard fastener 118. The fastener 118 can couple the lanyard to a cover. The lanyard fastener 118 can include at least one of a hook-and-loop fastener, a button, a zipper, a magnet, a peg and grommet, and combinations thereof. The lanyard can include a fastener 118, such as a portion of a hook-and-loop faster, to couple with a cover. The lanyard can be sewn to an inner portion of the backrest cushion 100, for example. The lanyard is useful to help the rider unfurl the cover from the housing 104 without letting the cover touch the ground and become dirty.

The present subject matter is not limited to examples in which the cover is coupled with the backrest cushion housing via a lanyard, and can include examples in which the cover is directly coupled to some portion of the backrest cushion housing.

The backrest cushion housing can be affixed to a backrest with fasteners. As mentioned elsewhere, the cushion can be retrofit into an existing backrest cushion configuration using existing fasteners. Fasteners can include, but are not limited to, screws and rivets, hooks, braces, sleeves and/or straps. Magnets can be installed in the backrest cushion housing which can provide a means of attaching backrest cushion to a ferrous portion of a backrest.

The backrest cushion can be constructed of any suitable material. Suitable materials can include, but are not necessarily limited to, plastics, canvas, leather, and combinations thereof. Suitable plastics include, but can be not limited to, polyesters, polyethylene terephthalate, polyurethanes, polycarbonates and combinations thereof. The backrest cushion housing can be lined with a water-resistant lining that can protect exterior leather from interior moisture, such as when the cover is put away while wet. The lining can be breathable, to allow the cover to dry over time. The backrest cushion housing can also include weep-holes to further promote drying.

In an alternative embodiment, a rigid box can be used to store the cover. The hard box can include padding on one side thereof to provide cushioning for the rider. The rigid box can be constructed of any suitable material. Suitable materials can include, but are not necessarily limited to, plastics, metals, canvas, leather, and combinations thereof. Suitable plastics include, but can be not limited to, polyesters, polyethylene terephthalate, polyurethanes, polycarbonates and combinations thereof. Suitable metals include, but can be not limited to, steel, stainless steel, aluminum, and alloys and combinations thereof.

Figure 2:
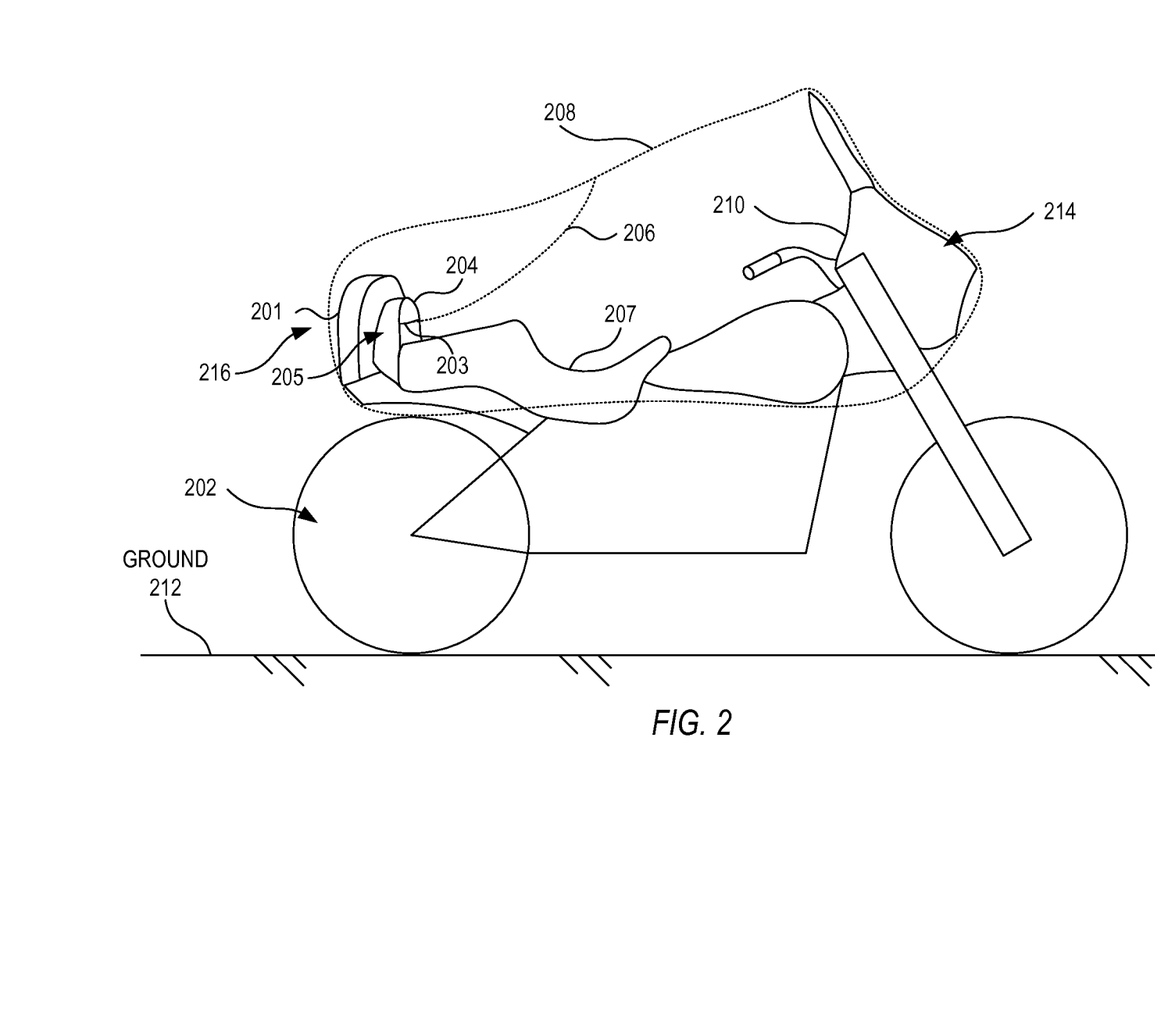
FIG. 2 shows a side view of a cover deployed from a backrest cushion affixed to a passenger backrest, according to an example.

FIG. 2 shows a side view of a cover deployed from a backrest cushion affixed to a passenger backrest 201, according to an example. The backrest cushion 205 can be mounted against a fixed backrest 201 of the motorcycle 202. The backrest cushion housing 204 can be sized to extend away from the motorcycle 202, for example above the motorcycle seat 207. The backrest cushion housing 204 can extend at least a lumbar height of a rider, for example a passenger. The height from the motorcycle to the opening 203 can be up to 16 inches, in some cases up to 14 inches and in other cases up to 12 inches. Also, the thickness of the backrest cushion housing 204 can be at least 2 inches, in some cases at least 4 inches and in other cases at least 6 inches.

The backrest cushion housing 204 can define an inner cavity accessible through an opening 203. A cover 208 can be stowed in the backrest cushion housing 204. The example can include a configuration wherein in a stowed mode of operation the backrest cushion housing 204 defines the backrest cushion 205 with padding for the cushion including the cover.

The rider can rest their back against and be supported by backrest 201 and can be cushioned by backrest cushion 205. The backrest cushion housing 204 can be attached to a front of motorcycle rider backrest 201. Such a backrest is alternatively termed a sissy bar or sister bar.

Backrest cushion 205 can be configured to mount behind a motorcycle seat 207. The bottom of backrest cushion housing 204 can be positioned below the seat, and can even fold under the seat. For example, a bottom portion can include elastic material that can slide under the one-piece motorcycle seat 207 to aid in securing the cushion 205 in place.

In a deployed mode of operation the cover 208 can extend around a front portion 214 of the motorcycle 202. The cover 208 can extend around a rear portion 216 of the motorcycle. The cover 208 can extend around instruments 210 of the motorcycle. The cover 208 can extend around the motorcycle seat 207 and the backrest cushion 204 as well. The cover can comprise a half-cover.

As illustrated, a lanyard 206 can be coupled between the backrest cushion housing 204 and the cover 208. The lanyard can be stowable in the backrest cushion housing. The lanyard can fix the cover to the backrest cushion in a partially-installed-cover mode of operation. For example, on a windy day, once one begins to extract the cover 208 from the housing 204, and fit the cover onto a portion of the motorcycle 202, such as the front portion (see FIG. 6 for a variation) or the rear portion (see FIG. 7 for a variation), the remainder of the cover can slide off a seat or otherwise blow out of control, possibly even onto the ground 212. Since fitting the cover to a portion of the motorcycle typically requires the use of both hands, the cover is free to move and the operator can find it difficult to control the cover. Thus, the lanyard 206 can support the cover off the ground 212 while the cover 208 is being fitted into place.

Figure 3:
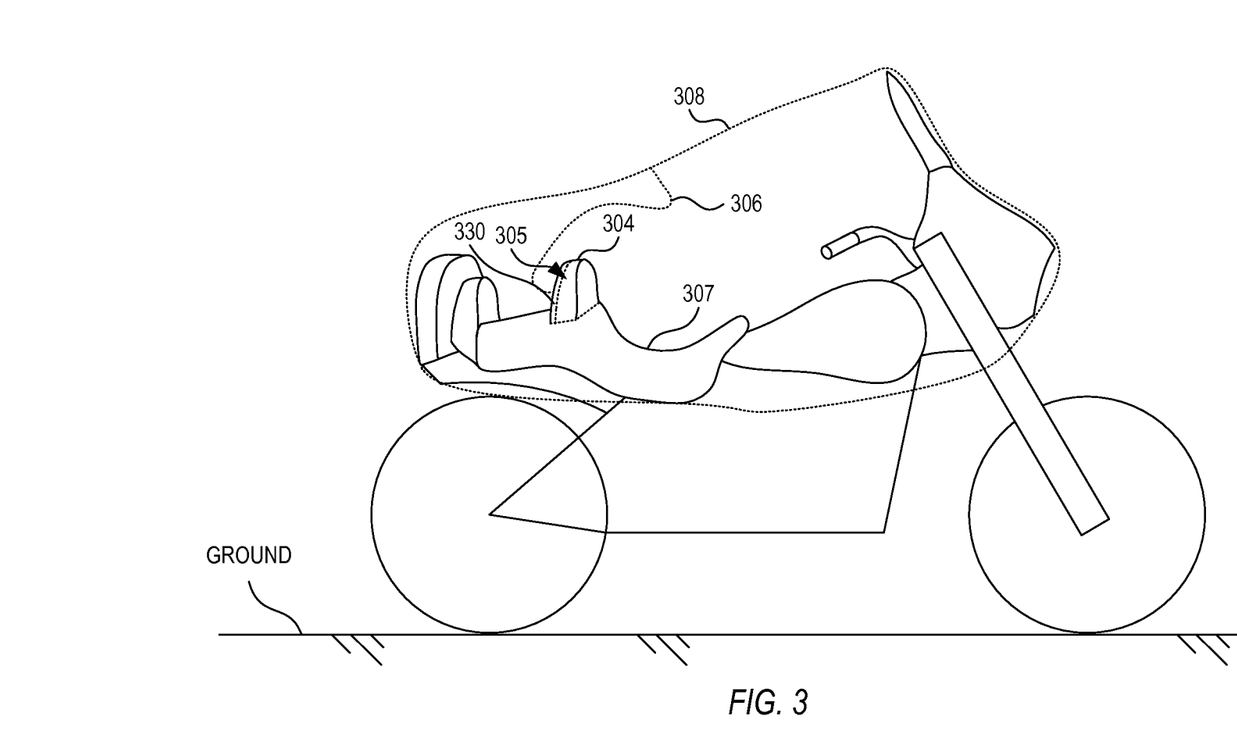
FIG. 3 shows a side view of a cover deployed from a backrest cushion affixed to a driver backrest, according to an example.

FIG. 3 shows a side view of a cover deployed from a backrest cushion affixed to a driver backrest, according to an example. The backrest cushion 305 assembly can be formed as part of a backrest of a driver motorcycle seat 307. The cushion 305 can include a frame 330 to provide support. The frame can be internal or external. In an external embodiment, the dashed lines of the illustrated cushion 305 would be solid.

The seat 307 can include one or more female anchors to receive a male connector of the backrest cushion 305. Such a male connector can be coupled with the internal frame of the cushion 305. A rigid frame can be retrofit with a housing to store the cover 308, and optionally, a lanyard 306. For example, in one method, a motorcycle owner could remove an original-equipment driver seat, deconstruct the original-equipment cushion housing and padding, and modify or replace the original cushion housing such that it defines a housing 304 sized to receive a cover 308 and lanyard 306 which can form at least a portion of the padding ultimately relied upon for comfort. Alternatively, a housing can be affixed over an original-equipment cushion. In some examples, the cushion can have additional padding.

The backrest cushion housing 304 can define an inner cavity accessible through an opening 303. A cover 308 can be stowed in the backrest cushion housing 304. The example can include a configuration wherein in a stowed mode of operation the backrest cushion housing 304 defines the backrest cushion 305 with padding for the cushion including the cover.

As illustrated, a lanyard 306 can be coupled between the backrest cushion housing 304 and the cover 308. The lanyard can be stowable in the backrest cushion housing. As illustrated, an opening through which the cover is stowed can be located in the rear of the driver cushion 305. Alternatively, the opening can be located on the top of the cushion 305.

Figure 4:
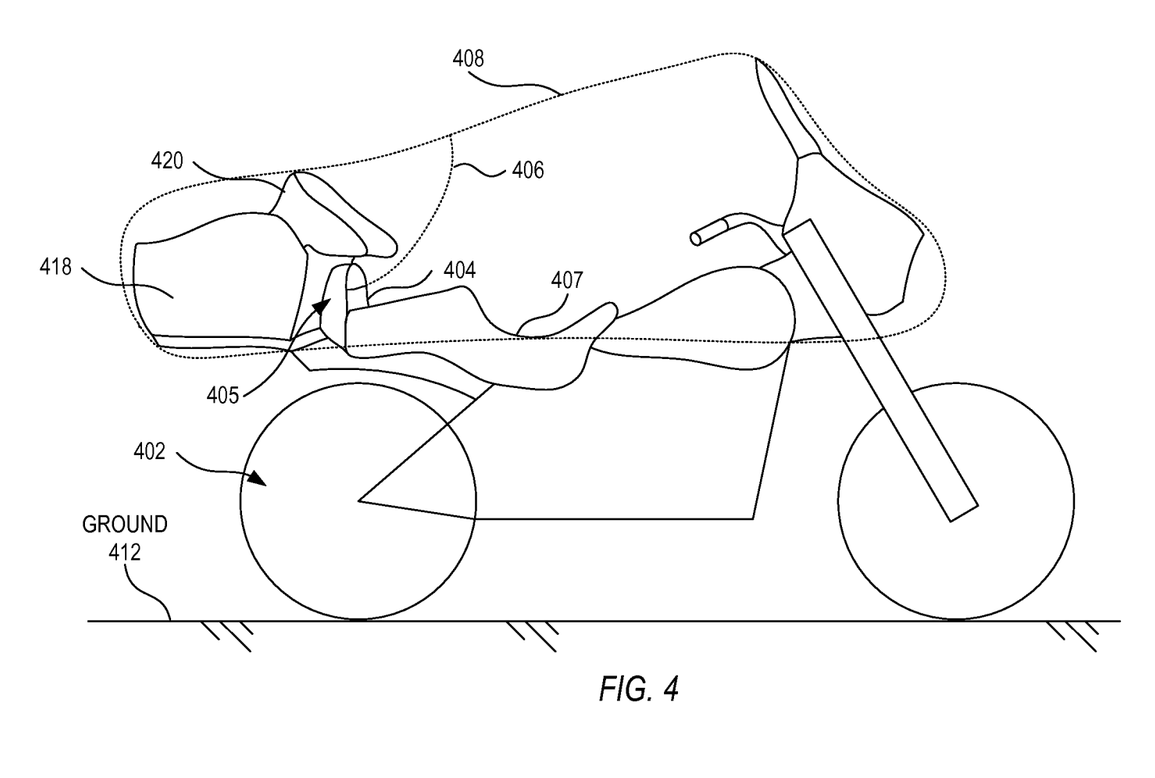
FIG. 4 shows a side view of a cover deployed from a backrest cushion affixed to a top case, according to an example.

FIG. 4 shows a side view of a cover deployed from a backrest cushion affixed to a top case, according to an example. The backrest cushion housing 404 is mountable to a top case 418 of the motorcycle 402. In some cases, the housing 404 can be retrofit in place of an original-equipment cushion.

The backrest cushion housing 404 can be located below a shoulder cushion 420 affixed to the top case 418. The backrest cushion housing 404 can be adapted to be removably mounted behind the seat 407 of the motorcycle 402. The cushion 405 can be shaped to fit between a shoulder cushion 420 and the seat 407 and can be contoured to complement the passenger seating area. In an example, the shoulder portion 420 can extend forward to accommodate a portion of the pressure exerted by the passenger. For example, the should portion 420 can reduce the amount of pressure placed on the cushion 405 by the passenger.

The backrest cushion housing 404 can be attached to the top case 418 by means of fasteners, such as screws that can be threadably attached to holes in the top-case or in a bracket attached thereto. As mentioned elsewhere, the cushion can be retrofit into an existing backrest cushion configuration using existing fasteners. Fasteners can include, but are not limited to, screws and rivets, hooks, braces, sleeves and/or straps. Magnets can be installed in the backrest cushion housing which can provide a means of attaching backrest cushion to a ferrous portion of a backrest.

As illustrated, a lanyard 406 can be coupled between the backrest cushion housing 404 and the cover 408. The lanyard can be stowable in the backrest cushion housing 404. The lanyard can fix the cover to the backrest cushion in a partially-installed-cover mode of operation. For example, on a windy day, once one begins to extract the cover 408 from the housing 404, and fit the cover onto a portion of the motorcycle 402, such as the front portion (see FIG. 6 for a variation) or the rear portion (see FIG. 7 for a variation), the remainder of the cover can slide off a seat or otherwise blow out of control, possibly even onto the ground 412. Since fitting the cover to a portion of the motorcycle typically requires the use of both hands, the cover is free to move and the operator can find it difficult to control the cover. Thus, the lanyard 406 can support the cover off the ground 412 while the cover 408 is being fitted into place.

Figure 5:
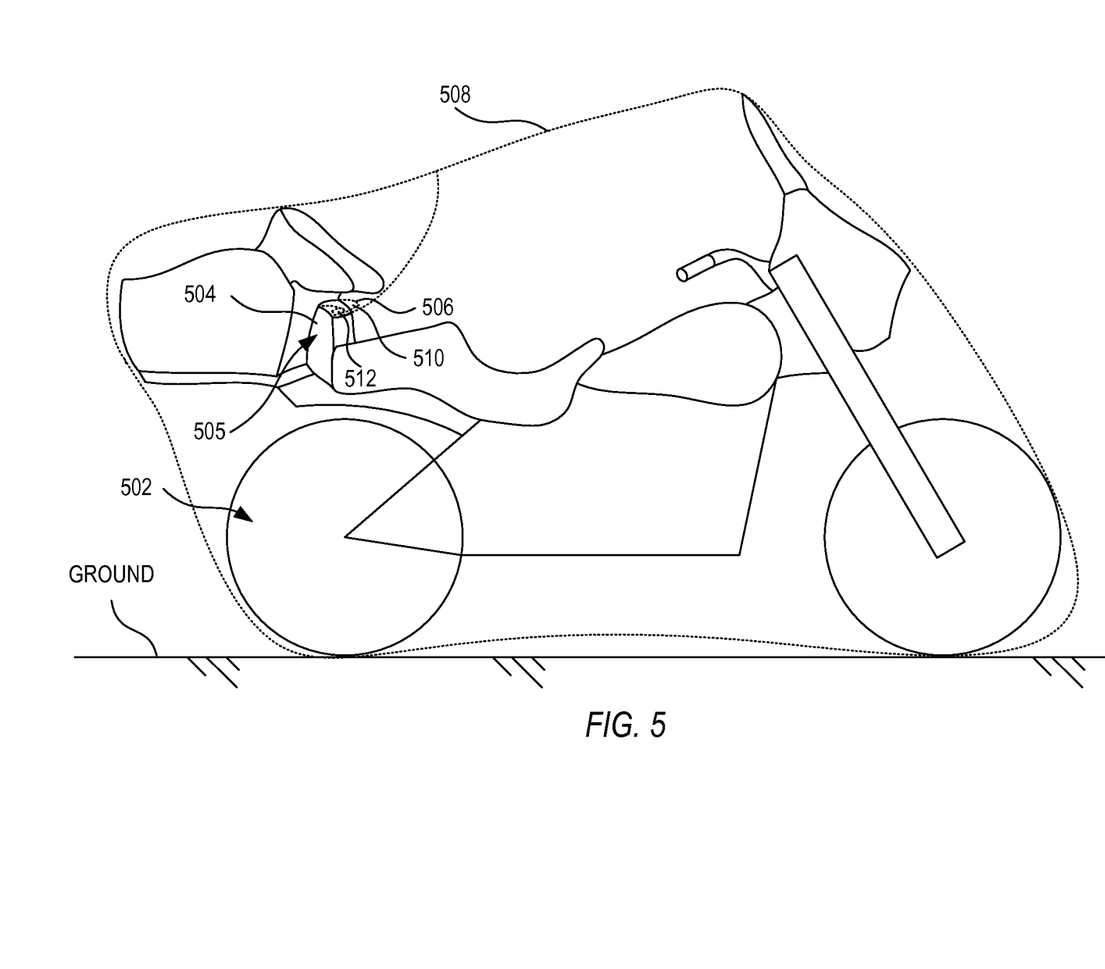
FIG. 5 shows a side view of a cover deployed from a backrest cushion affixed to a top case and covering wheels, according to an example.

FIG. 5 shows a side view of a cover deployed from a backrest cushion affixed to a top case and covering wheels, according to an example. In the illustration, a full-sized cover 508 (e.g., a full-cover) covers the front and rear wheels of the motorcycle 502. The cushion 505 can provide a means to store the cover 508 while isolating soil, such as from the front and rear wheels of the motorcycle 502, from other articles stored for travel, such as clothing. Thus, the cushion 505 can be lined with a water-resistant liner. The cushion 505 can include weep holes. A liner can be removable and washable. In the example, a flap 506 is shown providing a closure for a top-loading housing 504. The dashed lines represent the flap in a flap-open mode of operation, and the solid lines show the flap in a flap-closed mode of operation. The flap can fold forward and can include an end-portion fastener 510, e.g. one portion of a hook-and-loop fastener, to fasten to a front portion 512 of the housing, e.g. a mating portion of a hook-and-loop fastener.

Figure 6:
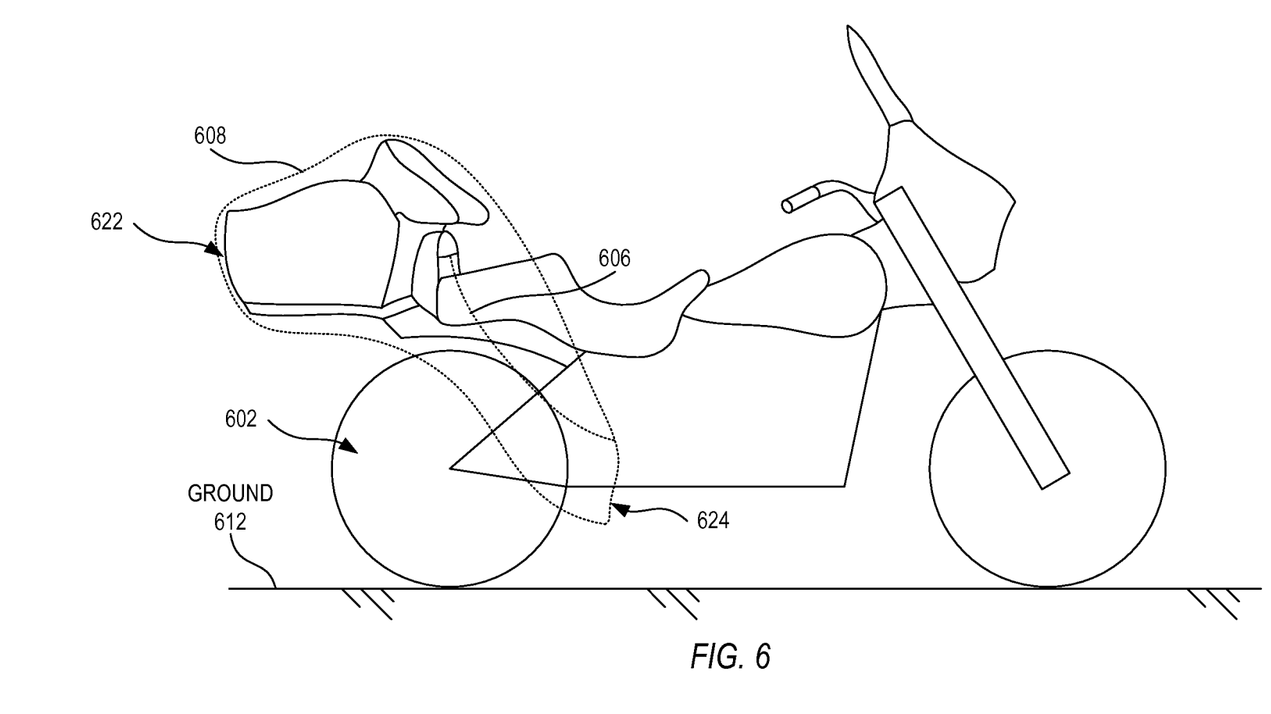
FIG. 6 shows a side view of a cover deployed from a cover hanging on a top case and from a lanyard, according to an example.

FIG. 6 shows a side view of a cover deployed from a cover hanging on a top case and from a lanyard, according to an example. In the example, a rear portion 622 of the cover 608 extends around a rear of the motorcycle 602. The lanyard 606 can be sized to support the cover 608 off the ground 612. For example, a front portion 624 of the cover 608 can be supported off the ground 612.

Figure 7:
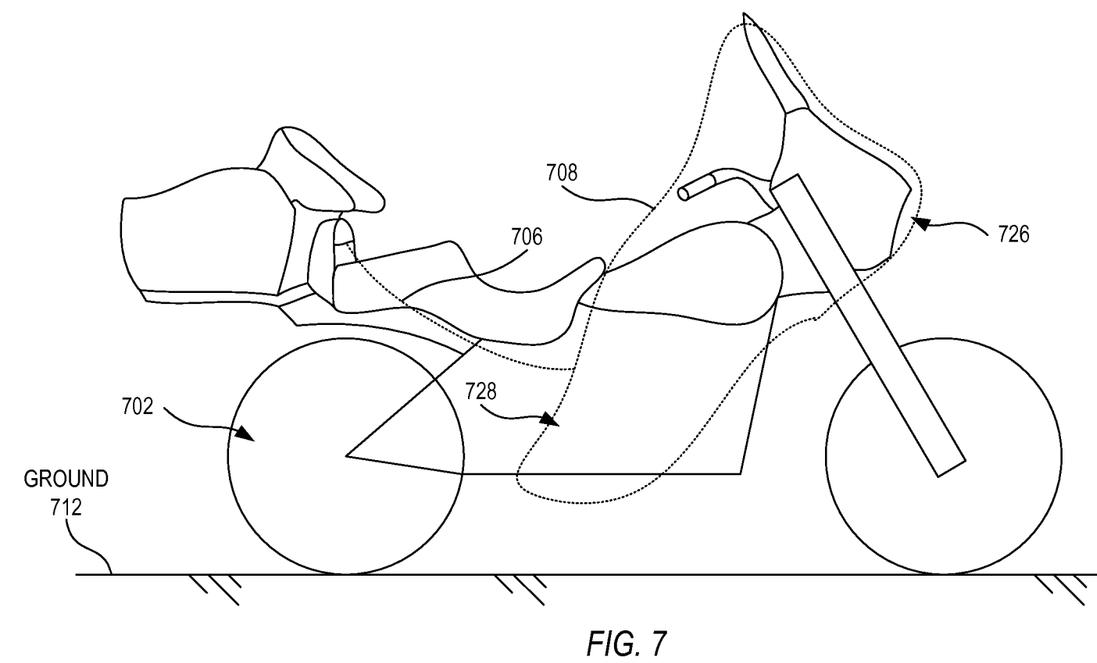
FIG. 7 shows a side view of a cover deployed from a cover hanging on a faring and from a lanyard, according to an example.

FIG. 7 shows a side view of a cover deployed from a cover hanging on a faring and from a lanyard, according to an example. In the example, a front portion 726 of the cover 708 extends around a front of the motorcycle 702. The lanyard 706 can be sized to support the cover 708 off the ground 712. For example, a rear portion 728 of the cover 708 can be supported off the ground 712.

Figure 8:
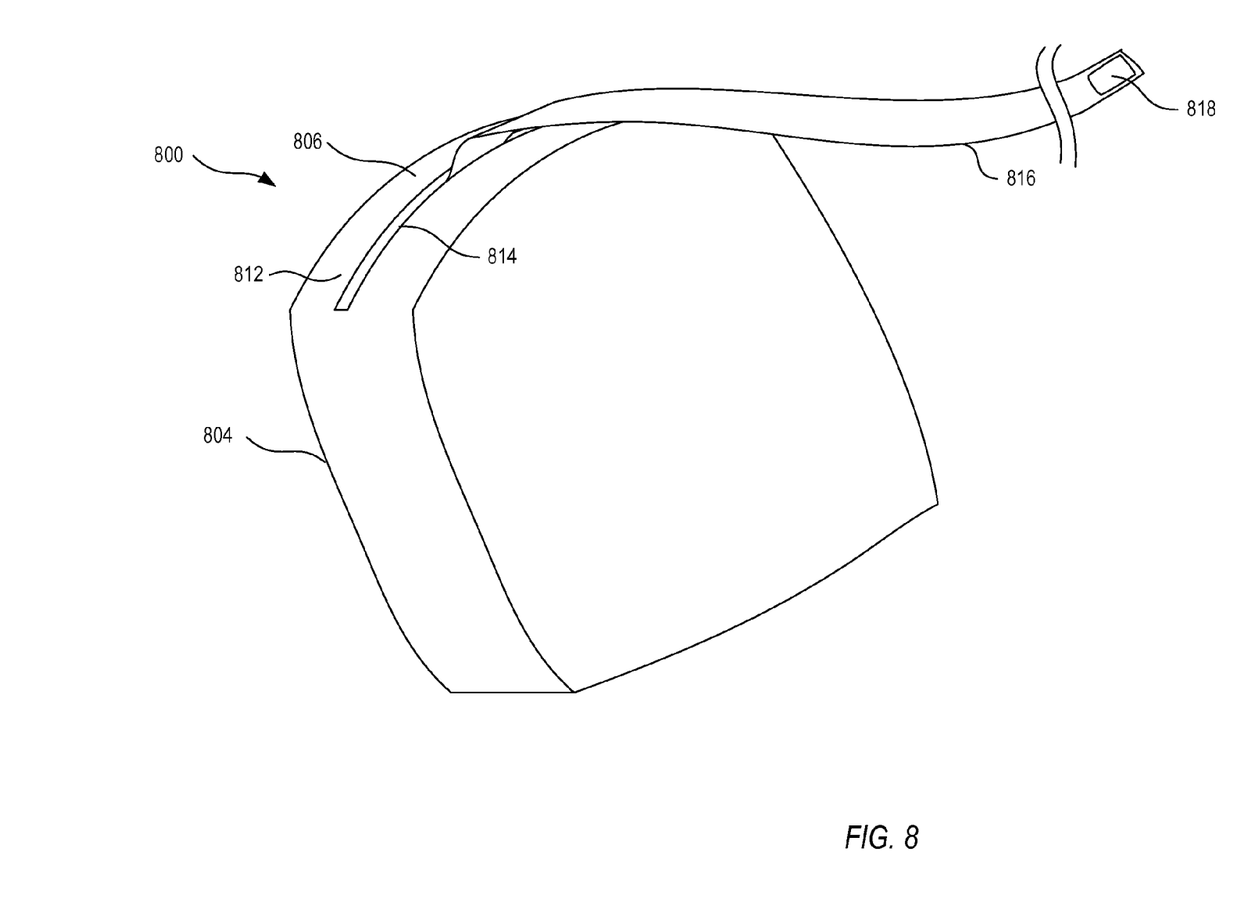
FIG. 8 shows a perspective view of a backrest cushion with a top closure, according to an example.

FIG. 8 shows a perspective view of a backrest cushion with a top closure, according to an example. The backrest cushion 800 can be formed of a backrest cushion housing 804. An opening 814 can be mounted on the top surface 812 of the backrest cushion housing 804 so that access can be available to the cavity located therein. The opening 814 can include a zipper, however any of the closures detailed herein can be used. For example, a flap at the top can provide a closure for the housing. The flap can fold forward and can include an end-portion fastener to fasten to a front portion of the housing. Stitching can be placed along the edges of one-piece compartment in order to make the edges more aesthetically pleasing and durable.

A lanyard 816 can be affixed to the backrest cushion 800. The lanyard can include a lanyard fastener 818. The fastener 818 can couple the lanyard to a cover. The lanyard fastener 818 can include at least one of a hook-and-loop fastener, a button, a zipper, a magnet, a peg and grommet, and combinations thereof. The lanyard can include a fastener 818, such as a portion of a hook-and-loop faster, to couple with a cover. The lanyard can be sewn to an inner portion of the backrest cushion 800, for example. The lanyard is useful to help the rider unfurl the cover from the housing 804 without letting the cover touch the ground and become dirty.

Figure 9:
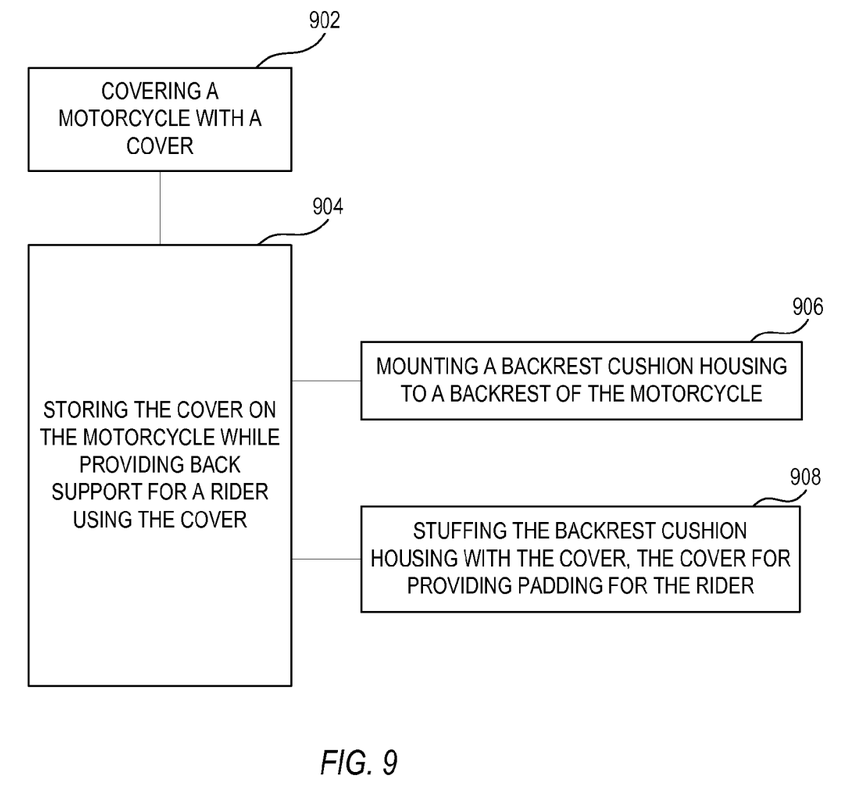
FIG. 9 shows a method of covering a motorcycle and using the cover as a backrest cushion, according to an example.

FIG. 9 shows a method 900 of covering a motorcycle and using the cover as a backrest cushion, according to an example. At 902, the method can include covering a motorcycle with a cover. At 904, the method can include storing the cover on the motorcycle while providing back support for a rider using the cover. At 906, this example can include mounting a backrest cushion housing to a backrest of the motorcycle, behind a motorcycle seat of the motorcycle, the backrest cushion housing extending away from the motorcycle, above the motorcycle seat to at least a lumbar height. At 908, storing the cover can include stuffing the backrest cushion housing with the cover, the cover for providing padding for the rider.

The above method, and other method examples disclosed herein, can include optional methods. An optional method can include covering an instrument of the motorcycle, a top case of the motorcycle, and the motorcycle seat. An optional method can include enveloping the instrument, the top case and the motorcycle seat. An optional method can include securing the cover to the backrest cushion housing with a lanyard. An optional method can include covering an instrument of the motorcycle and supporting the cover off of the ground with the lanyard. An optional method can include mounting the backrest cushion housing to the backrest including removing an original equipment backrest and installing the backrest cushion housing in the location of the original equipment backrest. An optional method can include installing fasteners in original equipment fastener locations.

NOTES AND EXAMPLES

Example 1 includes subject matter for storing a cover for a motorcycle while providing back support for a rider. The example can include a backrest cushion housing to be mounted behind a motorcycle seat of the motorcycle, against a fixed backrest of the motorcycle, the backrest cushion housing sized to extend away from the motorcycle, above the motorcycle seat extending to at least a lumbar height of the rider, the backrest cushion housing defining an inner cavity and an opening. The example can include a cover stowable in the backrest cushion housing. The example can include a configuration wherein in a stowed mode of operation the backrest cushion housing defines a backrest cushion with padding including the cover. The example can include a configuration wherein in a deployed mode of operation the cover extends around a front of the motorcycle and a back of the motorcycle, covering instruments of the motorcycle, the motorcycle seat and the backrest cushion.

Example 2 can include any of the preceding examples, comprising a lanyard coupled between the backrest cushion housing and the cover, the lanyard stowable in the backrest cushion housing.

Example 3 can include any of the preceding examples, wherein the lanyard fixes the cover to the backrest cushion in a partially-installed-cover mode of operation.

Example 4 can include any of the preceding examples, wherein in the partially-installed-cover mode of operation, a front portion of the cover extends around a front of the motorcycle, with the lanyard supporting the cover off the ground.

Example 5 can include any of the preceding examples, wherein in the partially-installed-cover mode of operation, a rear portion of the cover extends around a rear of the motorcycle, with the lanyard sized to support the cover off the ground.

Example 6 can include any of the preceding examples, wherein in the partially-installed-cover mode of operation, a front portion of the cover extends around a front of the motorcycle, with the lanyard sized to support the cover off the ground.

Example 7 can include any of the preceding examples, wherein the motorcycle seat can be a passenger motorcycle seat.

Example 8 can include any of the preceding examples, wherein a back of the backrest cushion housing can be mountable to a top case of the motorcycle.

Example 9 can include any of the preceding examples, wherein the backrest cushion housing can be located below a shoulder cushion affixed to the top case.

Example 10 can include any of the preceding examples, wherein the motorcycle seat can be a driver motorcycle seat.

Example 11 can include any of the preceding examples, comprising a passenger motorcycle seat affixed to the motorcycle behind the driver motorcycle seat.

Example 12 can include any of the preceding examples, comprising a closure defining the opening, wherein the closure includes at least one of a hook-and-loop fastener, a button, a zipper, a magnet, a peg and grommet, and combinations thereof.

Example 13 can include any of the preceding examples, wherein the closure can be formed by a first layer of the backrest cushion housing overlapping a second layer of the backrest cushion housing.

Example 14 can include any of the preceding examples, comprising a hook-and-loop fastener to couple the first layer to the second layer, with a first portion of the hook-and-loop fastener coupled to the first layer, and a second portion of the hook-and-loop fastener couple to the second layer.

Example 15 can include any of the preceding examples, wherein a lanyard fastener couples the lanyard to the cover, the fastener including at least one of a hook-and-loop fastener, a button, a zipper, a magnet, a peg and grommet, and combinations thereof.

Example 16 can include any of the preceding examples, wherein the lanyard can be sewn to the backrest cushion housing.

Example 17 can include any of the preceding examples, wherein the backrest cushion housing can be constructed of a material including at least one of plastics, metals, canvas, leather, and combinations thereof.

Example 18 can include any of the preceding examples, wherein the backrest cushion housing can be comprised of plastics including at least one of polyesters, polyethylene terephthalate, polyurethanes, polycarbonates and combinations thereof and/or a metal selected from the group consisting of steel, stainless steel, aluminum, and alloys and amalgams of such metals.

Example 19 can include any of the preceding examples, wherein the backrest cushion housing can be adapted to be removably mounted behind the seat of the motorcycle.

Example 20 can include any of the preceding examples, wherein the backrest cushion housing comprises a bottom portion to be affixed below a front of the motorcycle seat.

Example 21 can include any of the preceding examples, comprising a method of covering a motorcycle with a cover. The example can include storing the cover on the motorcycle while providing back support for a rider using the cover. The example can include mounting a backrest cushion housing to a backrest of the motorcycle, behind a motorcycle seat of the motorcycle, the backrest cushion housing extending away from the motorcycle, above the motorcycle seat to at least a lumbar height. The example can include stuffing the backrest cushion housing with the cover, the cover for providing padding for the rider.

Example 22 can include any of the preceding examples, wherein covering the motorcycle includes covering an instrument of the motorcycle, a top case of the motorcycle, and the motorcycle seat.

Example 23 can include any of the preceding examples, wherein covering includes enveloping the instrument, the top case and the motorcycle seat.

Example 24 can include any of the preceding examples, wherein covering the motorcycle with the cover includes securing the cover to the backrest cushion housing with a lanyard.

Example 25 can include any of the preceding examples, wherein covering the motorcycle includes covering an instrument of the motorcycle and supporting the cover off of the ground with the lanyard.

Example 26 can include any of the preceding examples, wherein mounting the backrest cushion housing to the backrest includes removing an original equipment backrest and installing the backrest cushion housing in the location of the original equipment backrest.

Example 27 can include any of the preceding examples, wherein installing the backrest cushion housing in the location of the original equipment backrest includes installing fasteners in original equipment fastener locations.

The above detailed description includes references to the accompanying drawings, which form a part of the detailed description. The drawings show, by way of illustration, specific embodiments in that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for storing a cover for a motorcycle while providing back support for a rider, comprising:
    a backrest cushion housing to be mounted behind a motorcycle seat of the motorcycle, against a front side of a fixed backrest that faces forward toward the motorcycle seat, the backrest cushion housing sized to extend away from the motorcycle and above the motorcycle seat such that the backrest cushion housing can provide support for a rider when seated on the motorcycle seat, the backrest cushion housing defining an inner cavity and an opening on a top side or a front side of the backrest cushion housing; and
    a cover stowable in the backrest cushion housing,
    wherein in a stowed mode of operation the backrest cushion housing defines a backrest cushion with padding including the cover, and
    wherein in a deployed mode of operation the cover extends around a front of the motorcycle and a back of the motorcycle, covering the front of the motorcycle, the motorcycle seat and the backrest cushion.

2. The system of claim 1, comprising a lanyard coupled between the backrest cushion housing and the cover, the lanyard stowable in the backrest cushion housing.

3. The system of claim 2, wherein the lanyard fixes the cover to the backrest cushion in a partially-installed-cover mode of operation.

4. The system of claim 3, wherein in the partially-installed-cover mode of operation, a front portion of the cover extends around a front of the motorcycle, with the lanyard supporting the cover off the ground.

5. The system of claim 4, wherein in the partially-installed-cover mode of operation, a rear portion of the cover extends around a rear of the motorcycle, with the lanyard sized to support the cover off the ground.

6. The system of claim 2, wherein a lanyard fastener couples the lanyard to the cover, the fastener including at least one of a hook-and-loop fastener, a button, a zipper, a magnet, a peg and grommet, and combinations thereof.

7. The system of claim 1, wherein the motorcycle seat is a passenger motorcycle seat.

8. The system of claim 7, wherein a back of the backrest cushion housing is mountable to a top case of the motorcycle.

9. The system of claim 8, wherein the backrest cushion housing is located below a shoulder cushion affixed to the top case.

10. The system of claim 1, wherein the motorcycle seat is a driver motorcycle seat.

11. The system of claim 10, comprising a passenger motorcycle seat affixed to the motorcycle behind the driver motorcycle seat.

12. The system of claim 1, wherein the backrest cushion housing is adapted to be removably mounted behind the seat of the motorcycle.

13. The system of claim 12, wherein the backrest cushion housing comprises a bottom portion to be affixed below a front of the motorcycle seat.

14. A method, comprising:
  covering a front of a motorcycle and a seat of the motorcycle with a cover; and
  storing the cover on the motorcycle while providing back support for a rider using the cover, comprising:
    mounting a backrest cushion housing to a front side of a backrest positioned behind the motorcycle seat of the motorcycle, the front side of the backrest facing forward toward the motorcycle seat, the backrest cushion housing extending away from the motorcycle and above the motorcycle seat to provide support for a rider when seated on the motorcycle seat, wherein the backrest cushion housing has an opening on a front side or a top side; and
    stuffing the backrest cushion housing with the cover, the cover providing padding for the rider.

15. The method of claim 14, wherein covering a top case of the motorcycle.

16. The method of claim 15, wherein covering includes enveloping the front of the motorcycle, the top case and the motorcycle seat.

17. The method of claim 14, wherein covering the motorcycle with the cover includes securing the cover to the backrest cushion housing with a lanyard.

18. The method of claim 17, wherein covering the motorcycle includes covering a front of the motorcycle and supporting the cover off of the ground with the lanyard.

19. The method of claim 14, wherein mounting the backrest cushion housing to the backrest includes removing an original equipment backrest and installing the backrest cushion housing in the location of the original equipment backrest.

20. The method of claim 19, wherein installing the backrest cushion housing in the location of the original equipment backrest includes installing fasteners in original equipment fastener locations.

* * * * *